(12) United States Patent
Liu et al.

(10) Patent No.: US 6,523,046 B2
(45) Date of Patent: Feb. 18, 2003

(54) INFRASTRUCTURE AND METHOD FOR SUPPORTING GENERIC MULTIMEDIA METADATA

(75) Inventors: Min Liu, Redmond, WA (US); Michael D. Stokes, Redmond, WA (US); Gilman K. Wong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 142 days.

(21) Appl. No.: 09/732,620

(22) Filed: Dec. 7, 2000

(65) Prior Publication Data

US 2002/0120634 A1 Aug. 29, 2002

Related U.S. Application Data

(60) Provisional application No. 60/185,032, filed on Feb. 25, 2000.

(51) Int. Cl.[7] .............................................. G06F 17/30
(52) U.S. Cl. .................................................. 707/104.1
(58) Field of Search ................................ 707/1–3, 100, 707/103, 104.1, 501.1

(56) References Cited

U.S. PATENT DOCUMENTS

| | | | | |
|---|---|---|---|---|
| 5,832,499 A | * | 11/1998 | Gustman | 707/1 |
| 5,870,549 A | * | 2/1999 | Bobo, II | 348/14.01 |
| 6,144,375 A | * | 11/2000 | Jain et al. | 345/420 |
| 6,246,752 B1 | * | 6/2001 | Bscheider et al. | 379/111 |
| 6,252,947 B1 | * | 6/2001 | Diamond et al. | 379/88.09 |
| 6,324,581 B1 | * | 11/2001 | Xu et al. | 707/10 |
| 6,353,831 B1 | * | 3/2002 | Gustman | 707/10 |
| 6,360,234 B2 | * | 3/2002 | Jain et al. | 707/500.1 |

* cited by examiner

Primary Examiner—Wayne Amsbury
Assistant Examiner—Hanh Thai
(74) Attorney, Agent, or Firm—Leydig, Voit & Mayer, Ltd.

(57) ABSTRACT

A method and apparatus are disclosed for providing access by applications/utilities/tools to multimedia file metadata originally provided in any of a set of supported formats. A metadata abstraction interface is interposed between multimedia files and applications that seek to read and/or modify metadata associated with the multimedia files. The metadata abstraction interface supports program access to multimedia file metadata provided in a variety of formats and comprises a multimedia application program interface corresponding to a set of core multimedia file metadata management functions accessible by multimedia applications. The metadata abstraction interface includes an extensible set of file type-specific metadata decoders. Each decoder includes a metadata converter for parsing a metadata portion of a multimedia file stored in a particular native format (e.g., .bmp). The decoders render metadata in a generic format from the parsed metadata.

24 Claims, 5 Drawing Sheets

|  | Data Type | Field Name | Comment |
|---|---|---|---|
| 300 | PROPID | Id | ID name of the property |
| 302 | ULONG | Length | length of the property |
| 304 | WORD | Type | type of the value (see Fig. 4 below for possible Tag_Type_x values) |
| 306 | VOID* | Value | property value pointer |

FIG. 3

|  | Data Type Name | Description |
|---|---|---|
| 310 | TAG_TYPE_BYTE | An 8-bit unsigned integer. |
| 312 | TAG_TYPE_ASCII | An 8-bit byte containing one 7-bit ASCII code, NULL-terminated. |
| 314 | TAG_TYPE_SHORT | A 16-bit unsigned integer. |
| 316 | TAG_TYPE_LONG | A 32-bit unsigned integer. |
| 318 | TAG_TYPE_RATIONAL | Two LONGs. The first LONG is the numerator and the second LONG is the denominator. |
| 320 | TAG_TYPE_UNDEFINED | An 8-bit byte that can take any value depending on field definition. |
| 322 | TAG_TYPE_SLONG | A 32-bit signed integer (two's compliment notation). |
| 324 | TAG_TYPE_SRATIONAL | Two SLONGs. The first SLONG is the numerator and the second SLONG is the denominator. |

FIG 4

| | API/Function Name | Passed Input/Output Parameters |
|---|---|---|
| 400 | GetPropertyCount | (OUT UINT* numOfProperty) |
| 402 | GetPropertyIdList | (IN UINT numOfProperty, IN/OUT PROPID* list) |
| 404 | GetPropertyItemSize | (IN PROPID PROPID, OUT UINT* size) |
| 406 | GetPropertyItem | (IN PROPID PROPID, IN UINT propSize, IN/OUT PropertyItem* buffer) |
| 408 | SetPropertyItem | (IN PropertyItem item) |
| 410 | RemovePropertyItem | (IN PROPID propId) |
| 412 | GetPropertySize | (OUT UINT* totalBufferSize, OUT UINT* numProperties) |
| 414 | GetAllPropertyItems | (IN UINT totalBufferSize, IN UINT numProperties, IN/OUT PropertyItem* allItems) |

FIG. 5

| | API/Function Name | Passed Input/Output Parameters |
|---|---|---|
| 420 | GetPropertyBuffer | (IN UINT uiTotalBufferSize, IN/OUT PropertyItem** ppBuffer) |
| 422 | PushPropertyItems | (IN UINT uiNumOfPropertyItems, IN UINT uiTotalBufferSize, IN/OUT PropertyItem* pItemBuffer) |

FIG. 6

INFRASTRUCTURE AND METHOD FOR SUPPORTING GENERIC MULTIMEDIA METADATA

CROSS-REFERENCE TO RELATED APPLICATION

This application claims benefit of US Provisional Patent Application No. 60/185,032, filed Feb. 25, 2000, the contents of which are expressly incorporated herein by reference in their entirety.

AREA OF THE INVENTION

The present invention generally relates to the area of methods and systems for maintaining and using information relating to the contents of a file (i.e., metadata). More particularly, the present invention relates to multimedia file metadata storage and retrieval schemes.

BACKGROUND OF THE INVENTION

Multimedia file metadata consists of information relating to, and often describing the content portion of a multimedia file. Metadata is typically not the data of primary interest to a viewer of the file data contents. Instead, file metadata information comprises supporting information providing a context to the situation in which the image/voice content data was recorded or modified. Examples of multimedia file metadata include: time, date, author, subject, comments (including audio attachments), frame width, frame height, etc.

Multimedia metadata information is generally created or updated when a multimedia file is created or edited, and a number of different sources provide such metadata. An author or editor designates metadata for a multimedia file. The user may designate the metadata at the time of initial recording via a user input interface on a recording device. Alternatively, a user provides metadata at a later time by means of a multimedia file editor application program. In other instances, a device that creates/modifies the multimedia file automatically renders file metadata according to device settings or sensed conditions.

The popularity of digitally recording audio/visual works has rapidly increased over the past decade. Higher capacity memory devices, improved integrated circuit technology, and improved data compression/encoding formats have contributed to making digital storage of audio/visual works both desirable and commercially feasible.

Multimedia file metadata is becoming more important as users increase their reliance upon digital storage media to store vast amounts of photographs and audio/visual recordings rendered by digital cameras and other digital multimedia recording equipment. The archived digital multimedia files may number in the hundreds or even thousands on a single computer or directory. The presence of metadata, such as an "event" field, in such files provides a useful means for searching and arranging the stored metadata files in a meaningful manner.

While older model cameras and video cameras stored time and date metadata information types, new digital multimedia equipment and software support dozens of metadata types for storing metadata recorded and output to users in a variety of formats (including both audio and visual output interfaces). Furthermore, software developers have created a number of sophisticated applications for recording, editing and maintaining the multimedia recordings and their associated metadata. The enhanced body of metadata supported by today's metadata schemes facilitates a variety of unique and meaningful file search and arrangement strategies/functions.

The rapid development of digital imaging technology has primarily occurred through independent efforts of particular associations. As a result of independent development efforts, there is presently no universal metadata standard for digital images. Instead several differing metadata specifications have been promulgated in association with each of the differing digital image encoding formats. Examples of the various digital image encoding formats include: TIFF, EXIF, BMP, PNG, and GIF. Each digital image encoding format has its own distinct specification for representing metadata associated with a digital image file (i.e., metadata scheme).

Today's multimedia applications support/utilize a variety of metadata storage schemes. Each metadata scheme defines supported metadata types and a manner for storing metadata of the supported metadata types. Many, if not most, of the present multimedia applications support only a single or limited number of metadata storage schemes. The combination of multiple multimedia metadata schemes and limited decoding capabilities within applications substantially limit the potential utility of multimedia applications with regard to retrieving and presenting metadata for multiple file types to users and directory arrangement/presentation tools.

Efforts have been made to accommodate the existence of multiple differing digital image metadata formats. Currently, one solution to the proliferation of multiple differing image metadata formats is to include a metadata decoder within image processing applications for each supported image format. In addition to the above proposed solution, there has been an effort to specify a universal, XML-based image metadata scheme. Image file metadata decoders within applications created in accordance with the proposed universal metadata scheme utilize the extensible universal image metadata specification to decode image metadata stored according to the universal specification. The extensible quality of the universal standard facilitates updating the universal specification to include new metadata types. The universal metadata scheme does not contemplate backward compatibility. Thus, universal scheme metadata decoders will not support any of the above-mentioned predecessor metadata formats. If the universal specification is successful, the number of applications supporting the "old" formats will likely dwindle thus leaving the owners of digital images encoded in the old formats with a diminishing supply of applications supporting their images' formats.

SUMMARY OF THE INVENTION

The present invention comprises an infrastructure and method for providing format-independent access by applications to multimedia file metadata originally provided in any of a set of supported formats. More particularly, in accordance with the present invention, a metadata abstraction interface is interposed between multimedia files and applications that seek to read metadata associated with the multimedia files.

The metadata abstraction interface supports program access to multimedia file metadata provided in a variety of formats and comprises a multimedia application program interface corresponding to a set of core multimedia file metadata management functions accessible by multimedia applications. Programs (e.g., applications), through the application program interface, submit requests to read and/or modify metadata contents of multimedia files. The requesters need not know or specify the format of the multimedia files and their corresponding metadata.

The metadata abstraction interface includes an extensible set of metadata decoders. Each decoder includes a metadata converter for parsing a metadata portion of a multimedia file stored in a particular native format (e.g., .bmp). The decoders render metadata in a generic format from the parsed metadata. The generic format insulates the applications from the differences present in the various multimedia file metadata formats.

The multimedia application program interface comprises a set of program instruction segments within the metadata abstraction interface for invoking particular ones of the extensible set of metadata decoders to obtain and/or modify metadata corresponding to a multimedia file. Thus, applications need only follow a simple set of interface rules when requesting a metadata related request. The requests need not consider the manner in which a particular set of file metadata is stored since the decoders and encoders of the abstraction interface handle differences between various native multimedia file formats.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 3 is a table illustratively depicting an exemplary metadata property item data structure;

FIG. 4 is a table depicting the various forms of data stored in the data fields of the generic metadata property items;

FIG. 5 is a table summarizing a set of API's called by applications to invoke corresponding functions provided by abstraction interface decoders to carry out the abstraction interface functionality through creation and maintenance of generic metadata;

FIG. 6 is a table summarizing a set of functions supported by a metadata sink/encoder within the abstraction interface to receive and store within an image file property items/metadata submitted by a decoder.

DETAILED DESCRIPTION OF AN ILLUSTRATIVE EMBODIMENT

The need for a solution to the present problem of multiple metadata formats is addressed by the disclosed abstraction interface architecture for presenting metadata, originating from image files stored in a variety of formats, to requesting applications. The exemplary embodiment of the metadata abstraction interface architecture, disclosed herein, provides a convenient interface for applications to access image file metadata stored in a variety of formats. In an embodiment of the invention, the abstraction interface is capable of interfacing, through defined application program interfaces (APIs), API-aware programs to metadata for image files stored in a variety of formats. While the drawings and detailed description focus primarily upon image files, the abstraction interface architecture is intended to be generalized to multimedia files, including video and audio files that include metadata information portions stored according to a number of distinct metadata formats.

Figure 1:
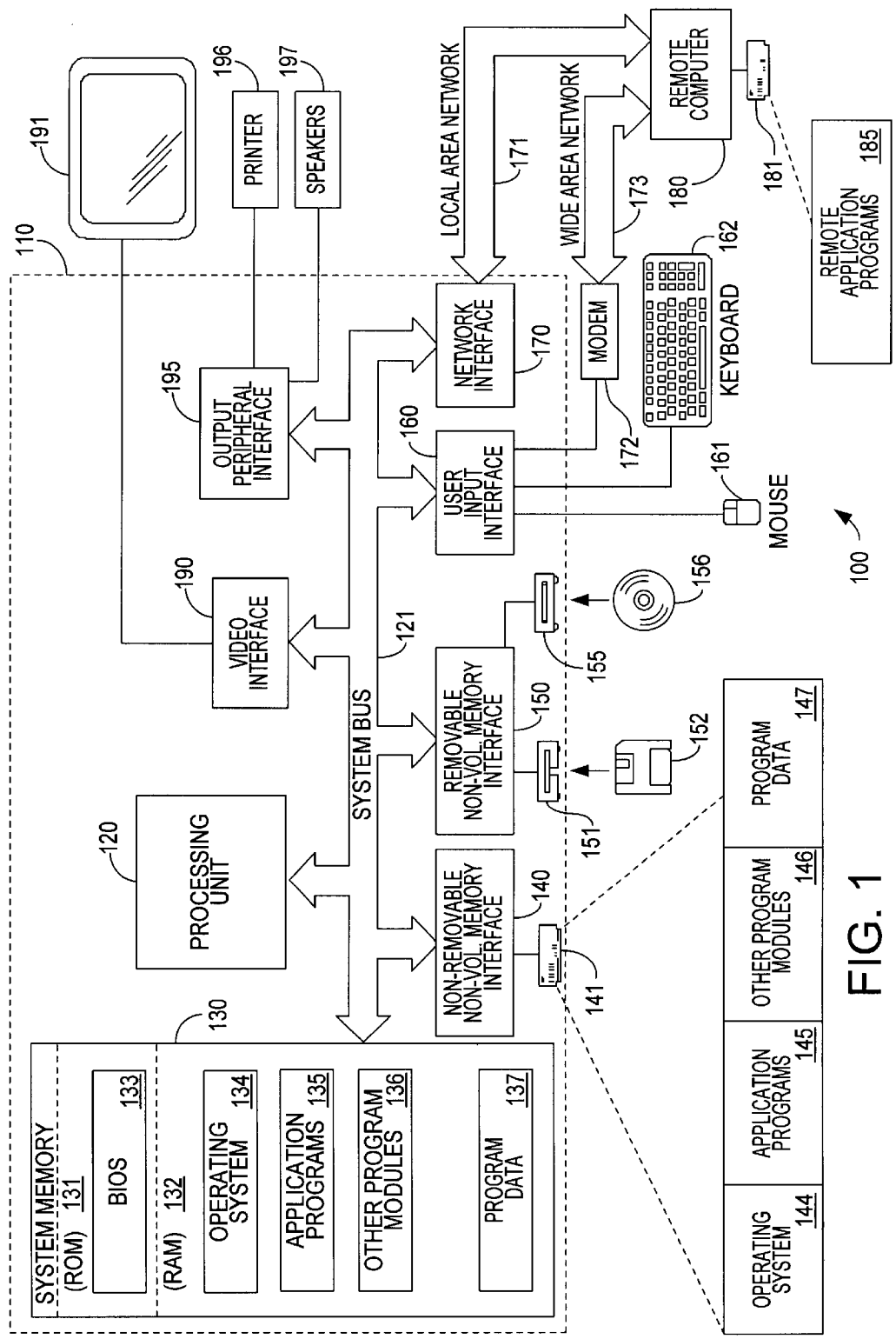
FIG. 1 is a schematic drawing illustratively depicting an exemplary operating environment for carrying out an embodiment of the present invention.

FIG. 1 illustratively depicts an example of a suitable operating environment 100 within which the invention may be implemented. More particularly, FIG. 1 illustratively depicts a computer system capable of incorporating and executing the functionality of the multimedia metadata abstraction interface architecture disclosed in detail herein below. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like, either alone or in combination.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. Those skilled in the are will appreciate that the network connections shown are exemplary and other means of establishing a communications link between the computers may be used.

Figure 2:
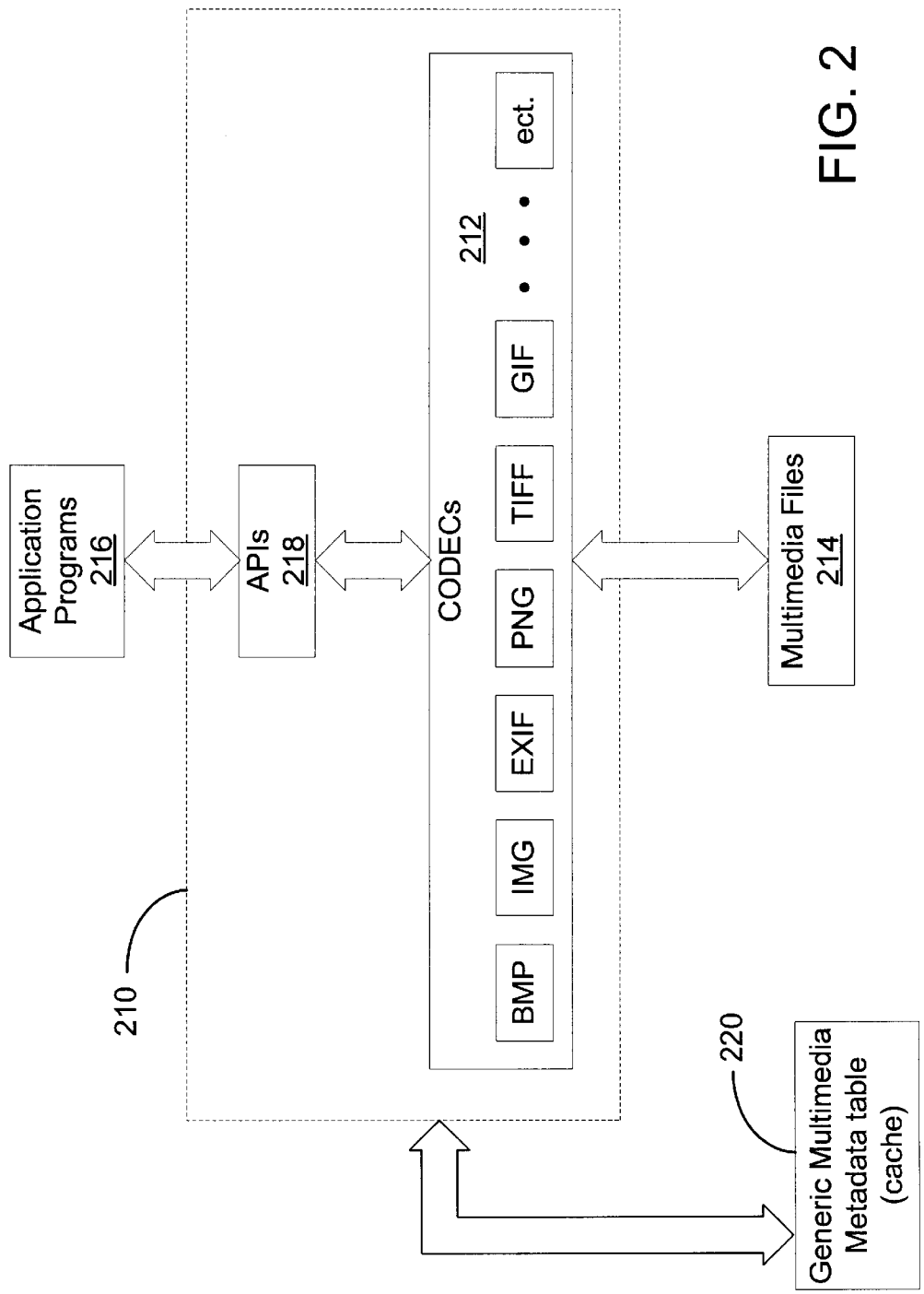
FIG. 2 is a schematic drawing depicting, at a high level the components and information flow of a system embodying the present invention.

Having described exemplary computing environments in which the present invention is carried out, attention is directed to FIG. 2 that schematically depicts an illustrative embodiment of a multimedia abstraction interface architecture. In general, a digital image metadata abstraction interface 210 depicted in FIG. 2 provides an extensible framework. The framework includes an extensible set of coder/decoder pairs 212 for processing image file metadata from image files 214 of any supported metadata format. Application programs 216 indirectly access coder/decoder pairs 212 via application programming interfaces (API's) 218. The primary components of the abstraction interface architecture and the component interactions are described herein below.

The digital image metadata abstraction interface 210 provides indirect access by applications (including content management utilities and tools), via a set of interface functions, to image metadata stored in any supported file format. More particularly, the abstraction interface 210 provides an abstracted metadata access interface that insulates applications (and their users) from particular image file metadata formats. The abstract interface enables programs to submit requests to a simple and consistent interface, provided in the form of API's 218, to access metadata without knowledge of a particular metadata file format.

Content management (e.g., field-specified directory presentation, searches, etc.) is an invaluable feature for imaging applications seeking to exploit the expanded set of metadata fields in image files. In an exemplary use of the present invention, a multimedia file directory content management application/utility issues calls to the API's 218 to carry out a set of directory management functions. In such instance, the abstraction interface 210 issues corresponding function calls to coder/decoder pairs 212 to execute content management requests. In an alternative embodiment, the API's 218 functionality merges with the coder/decoder pairs 212. It is contemplated that content management applications/tools/utilities will perform sequences of calls to the API's 218 to perform high-level operations such as creating custom (user-designated) image file directory views on behalf of an application. In such instance, application software developers need not implement content management functions separately in their software. Content management, plus a generic metadata specification (created by decoders), enable users to organize and search stored images by metadata values, such as the time a picture was taken, an event, a particular person-subject, a location, etc., without restricting their queries/requests to particular image file formats.

The metadata fields for multimedia files go beyond the typical time/date, file size, file type and file name found in typical metadata for non-multimedia files. Application-level content management utilities enable users to view and search a directory containing multimedia files according to various types of multimedia metadata. For example, a user may arrange files according to alphabetical location name (a potential metadata field for digital photo images). File-directory presentation utilities, aided by the set of embedded coder/decoders 212, perform searches and present image metadata in an orderly manner for a set of image files stored according to a variety of image file formats.

For example, a photograph editing application incorporating the present invention enables a photographer to arrange a number of digital photograph image files based upon a number of metadata fields including: camera model, focal length used, light level, etc. Such information exists in metadata for digital photo image files, and can be retrieved using the coder/decoder pairs 212 without restriction to a particular image file type even though image metadata is stored in a variety of formats corresponding to particular file types. The photograph editing application calls, for example, the GetPropertyItem(PropertyTagEquipModel, propertysize, *buffer) or GetPropertyItem (PropertyTagExifFocalLength, propertysize, *buffer) for each file in a particular directory (one call per file) to retrieve and display a set of digital photo image files grouped according to camera model and focal length, respectively.

Another example of an application utilizing the abstraction interface 210 is a configurable electronic photo album application. The electronic photo album provides a set of utilities enabling users to arrange their photo image files in a set of albums arranged according to any one of several possible grouping criteria supported by the wide variety of metadata types including time and color content. The abstraction interface allows users to store image files in a variety of formats on a digital data storage media and then retrieve and arrange the files in any one of several potential orders by designating a metadata ordering key.

The abstraction interface 210 supports a wide variety of image file formats—TIFF, EXIF, JFIF, GIF, PNG and BMP—and facilitates mapping standard metadata items between them. When converting a file from one supported format to another, the abstraction interface 210 preserves all possible metadata items in the destination file format.

The abstraction interface 210, in addition to the basic capability of calling certain basic functions in the coder/decoder pairs 212, also includes supplementary functions that facilitate preserving original metadata after creating generic metadata for a file. In an embodiment of the present invention, the abstraction interface 210 carries out metadata modifications across all metadata item values affected by image-altering operations. For example, developers can take advantage of a method to perform lossless 90-degree rotations in JPEG. The abstraction interface 210 updates standard metadata items, such as thumbnail, width, height, and orientation, to reflect the rotated image.

The abstraction interface 210 also preserves standard metadata items whenever possible. However, some operations might cause loss of private metadata. For example, it is not possible to determine whether a private width and height would still be relevant to a rotated image. The abstraction interface 210 discards such private metadata to prevent users from experiencing inconsistent behavior by the image after the rotation operation.

Each coder/decoder pair of the expandable set of coder/decoder pairs 212 includes data and computer instructions that perform encoding and decoding functions with regard to a particular metadata format (e.g., .bmp, .gif, tiff, .png, etc.). Each "decoder" of the coder/decoder pairs 212 renders generic metadata from metadata presented according to a particular metadata format (e.g., .bmp). The set of decoders facilitate rendering generic metadata from image files 214 stored according to any supported metadata formats.

In an exemplary embodiment of the invention, the abstraction interface 210 caches the generic metadata in a generic metadata table 220 after initially reading and decoding format-specific file metadata in response to an API call. The first time the abstraction interface 210 accesses an image file the called decoder parses the information in the image file and stores the information in a generic metadata format. The generic metadata table 220 stores the generic metadata in the form of a linked list of metadata property items. FIG. 3, described herein below, illustratively depicts an exemplary data structure for storing a property item.

When a particular called decoder of the set of coder/decoders 212 completes parsing the original metadata, the decoder, in addition to storing the linked list, stores one or more items identifying the size of various components of the property list and/or the size of memory consumed by the components of the property list. For example, a header length identifies the size of memory consumed by non-data portions of metadata items, and a data length field identifies the size of memory consumed by the actual metadata for an image file. Such data is useful when the abstraction interface 210 stores generic metadata for an image file in the form of a packed set of property header blocks wherein the final field of each header block contains a pointer to the corresponding metadata for the header block.

In alternative embodiments, the persistence of generic metadata varies according to the particular needs of the particular implementations. For example, an application may explicitly call for the abstraction interface 210 to delete a particular generic property list from the generic metadata table 220 by issuing a "terminate" command to the abstraction interface 210.

Each "coder" of the coder/decoder pairs 212 renders metadata in a particular supported format (e.g., BMP, JPG, TIFF, etc.) from any supported generic metadata item—thus enabling the abstraction interface 210 to present metadata in a format expected by a legacy application that supports only a particular metadata format. The coder/decoder pairs 212, when combined with a set of API's 218, enable abstraction interface API-aware applications to request presentation of metadata in any supported metadata format regardless of the format in which the original metadata is stored.

Having described the components of an abstraction interface 210 embodying the present invention, attention is directed to FIG. 3 that depicts an exemplary data structure for storing multimedia metadata items, and in particular image metadata. An id field 300 stores the identification of the property. The appendix portion of the specification herein below provides an exemplary list of different property types. As one will readily appreciate from viewing the list of exemplary property tags (corresponding to tag types), the types of metadata stored in image metadata files go well beyond the typical file metadata (e.g., file save date, size, extension, file name). The property tags represent image sizes and proportions, the equipment used to create an image, the techniques used to render the image, etc. The list of property types is a superset of the metadata items for all metadata schemes (e.g., .bmp, tiff, etc.) supported by the abstraction interface. The list is thus extensible to accommodate new metadata item types.

A length field 302 stores a value, of type ULONG, specifying the length of the data field storing the actual metadata associated with the metadata property item. A type field 304, of type WORD, specifies the form of the data stored in the aforementioned data field for the metadata property item. In the present embodiment of the invention, a total of eight different data forms are identifiable. Each of these types is discussed herein below with reference to FIG. 4. Finally, a value field 306 stores a pointer to the actual metadata for a particular metadata property item.

Turning now to FIG. 4, a table identifies and describes the various types of data referenced by the pointer value stored in the value field 306 for a particular metadata property item. A byte tag type 310 identifies the data within the referenced field as eight-bit unsigned integers. An ASCII tag type 312 identifies the data as 8-bit bytes containing 7-bit ASCII code with a null termination bit filling the eighth bit position. A short tag type 314 signifies 16-bit unsigned integer data, and a long tag type 316 indicates that the metadata for the particular property item is stored in the form of 32-bit unsigned integers. A rational tag type 318 indicates data stored as two long integers. The first long integer is the numerator, and the second long integer is the denominator of a rational value. An undefined tag type 320 indicates that the data is arranged in groups of eight-bit bytes that can take on any value depending on the field definition. For example, in EXIF there is a property called ComponentsConfiguration containing information specific to compressed data. The channels for each component are arranged in order from the first component to the fourth. For uncompressed data the data arrangement is given in the PhotometricInterpretation tag. However, since PhotometricInterpretation can only express the order of Y, Cb and Cr, the PhotometricInterpretation tag is provided for cases when compressed data uses components other than Y, Cb, and Cr and to enable support of other sequences. In such instances the generic property item is represented as follows:

ID=37121 (9101.H)

Length=4

Type=UNDEFINED

Default Value=4 5 6 0 (if RGB uncompressed) and 1 2 3 0 (any other cases)

0=does not exist

1=Y

2=Cb

3=Cr

4=R

5=G

6=B

Other=reserved

A "MakerNote" property item is another exemplary use of an undefined property item. The MakerNote property enables manufacturers of Exif writers to record any desired information. The contents are up to the manufacturer.

ID=37500 (927C.H)

Length=Any value

Type=UNDEFINED

Default=none

An s_long tag type 322 indicates that the data is represented in a signed 32-bit integer (two's compliment) format. An s_rational tag type 324 indicates that the data is stored in the form of two s_long values. The first s_long value is the numerator, and the second s_long value is the denominator of a rational value.

Having described the form of the data, attention is now directed to FIG. 5 that summarizes an exemplary set of API's within the API's 218 corresponding to functions supported by each decoder in the coder/decoders 212. Each of the decoder functions is exposed to user applications via the API's 218. Each image file type (e.g., BMP, JPG, TIFF, etc.) has a unique signature distinguishing the image file type from other file types. In a simplest case, this signature is the file name extension (e.g., .bmp). A called API selects/invokes a particular one of the decoders from the set of available coder/decoders 212 to perform a particular function based upon a unique signature associated with each supported image file (metadata) format.

A GetPropertyCount decoder function 400 returns the total number of property items stored in the generic metadata linked list for an identified image. After receiving the returned value (an unsigned integer), the calling application, may allocate a memory buffer. The unsigned integer value "numOfProperty" is the total number of property items stored in the generic metadata list. If there are no property items, the number will be zero.

A GetPropertyIDList decoder function 402 returns a list of Ids for all the property items stored in the metadata for the particular image file. The value "numOfProperty", obtained from the GetPropertyCount decoder function 400, specifies the number of property items the calling application is expecting from the decoder, and the calling application has allocated memory for storing this number of property item IDs. The value "list" is a memory buffer which the calling application has created to store the returned ID list. Upon success, this function returns "Ok." If the "numOfProperty" doesn't match the total number of property items stored for the particular image file, the function returns a status of "invalid parameter."

It is noted that the calling application is responsible for allocating memory for the ID list and free the memory afterwards. The following is a sample code sequence for a calling program that determines the number of number of items in a list, allocates a buffer for the property items, and then requests and prints the property items (but not the actual metadata).

```
Image myImage(foo.jpg);
UINT numOfProperty;
If ( (Foo.GetPropertyCount(&numOfProperty) == Ok)
    &&( numOfProperty !=0))
{
    PROPID* pPROPIDList = malloc(numOfProperty *
  sizeof(PROPID));
    If (pPROPIDList !=NULL)
    {
        if (Foo.GetPropertyIdList(numOfProperty, pPROPIDList)
== Ok)
        {
            // Display all the IDs in this list
            for (int i=0; i<numOfProperty; ++i)
            {
                printf("ID is %ld\n", pPROPIDList[i]);
            }
        }
    }
}
```

A GetPropertyItemSize decoder function 404 returns the size, in bytes, of the required property item specified by the ID. "PROPID" identifies the particular property item of interest. The function 404 returns "size." Size is the length in bytes, of the value field for the identified property item. If there is no such property item stored in the generic metadata list for the image file, the returned size will be zero. After the calling application receives the returned size value, the application can allocate a memory buffer based on the number.

A GetPropertyItem decoder function 406 stores an identified property item, specified by "PROPID," into an application-supplied input buffer. The total bytes being written by the function 406 into the identified buffer should equal the caller-specified "propSize." The caller is responsible for providing sufficient memory for retrieving this property item and freeing the memory afterwards. The "PROPID" is the ID of the property item to be provided by the decoder. The "propSize" is the expected size of the identified property item in bytes. The "buffer" input parameter identifies the buffer in which the property is to be stored by the called decoder function. The function 206 returns error notifications in the event that an input parameter is incorrect or the property item does not exist for the image file.

The following is an illustrative code sequence that requests and prints user annotations (comment metadata) for a file.

```
Image myImage(foo.jpg);
UINT propertySize;
If ( Foo.GetPropertyItemSize(EXIF_TAG_USER_COMMENT,
    &propertySize) == Ok)
{
    PROPID* pPropBuffer = malloc(propertySize);
    If (pPropBuffer !=NULL)
    {
        if (Foo.GetPropertyItem(EXIF_TAG_USER_COMMENT,
        propertySize,
        pPropBuffer)
        == Ok)
```

-continued

```
        {
            // Display the annotation
            printf("annotation is %s\n", *pPropBuffer);
        }
    }
}
```

A SetPropertyItem decoder function 408, when called by an application program, sets a property item in the generic metadata property list for the image. If the property item already exists in the linked list of properties for the file metadata of interest, a new property value specified by the calling program replaces a prior value. If the property item does not yet exist in the linked list of properties in the generic metadata property list, the property item is added to the list. In the input parameters to the function 408, "item" is the property item the calling program intends to set.

The following is an example of a code sequence wherein a comment is entered in the "comment" property field of metadata for an identified image file.

```
Image myImage(foo.jpg);
PropertyItem item;
char propValue[] = "GDI+test";
item.id = EXIF_TAG_USER_COMMENT;
item.value = propValue;
If ( Foo.SetPropertyItem(item) == Ok)
{
    printf("annotation set\n");
}
else
{
    printf("Set annotation failed\n");
}
```

A RemovePropertyItem decoder function 410 removes a property item, specified by the PROPID, from the generic metadata property item list for an identified image file. The input parameter "propId" is the ID of the property item the calling program wants to remove from the property list. The following is an exemplary program sequence utilizing the RemovePropertyItem decoder function 410.

```
Image myImage(foo.jpg);
If ( Foo.RemovePropertyItem(EXIF_TAG_USER_COMMENT) == Ok)
{
    printf("annotation removed\n");
}
else
{
    printf("Removing annotation failed\n");
}
```

A GetPropertySize decoder function 412 returns the size, in bytes, of all the property items stored in the generic metadata property item list for an image file. With regard to the passed parameters, "totalBufferSize" is the size, in bytes, for all the property items stored in the metadata property item list and "numProperties" is the total number of property items stored in the list.

A GetAllPropertyItems decoder function 414 returns all the property items stored in the generic metadata property item list for an image file. With regard to the parameters, "totalBufferSize" is the size, in bytes, the caller allocated in a buffer for storing the result, "numProperties" is the number of property items stored in the metadata property item list for the image file. The input/output parameter "allItems" is a pointer to a chunk of memory allocated by the calling application to store the returned generic metadata property item list. This function will fill the memory with an array of generic metadata property items stored for the image file. The following code segment is an example of a potential use for the GetAllPropertyItems decoder function 414.

```
Image myImage(foo.jpg);
UINT propertySize;
UINT numProperties;
If ( Foo.GetPropertySize(&propertySize, &numProperties) == Ok)
{
    PropertyItem * pPropBuffer =
            (PropertyItem *)malloc(propertySize);
    If(pPropBuffer != NULL)
    {
        if (Foo.GetAllPropertyItems (propertySize,
                        numProperties,
                        pPropBuffer) == Ok)
        {
            // Display all the properties
            for (int i=0; i<numProperties; ++i)
            {
                switch (pPropBuffer[i]->id)
                {
                case ID_ANNOTATION:
                    printf("annotation is %s\n",
                        pPropBuffer[i]->value);
                    break;
                case ID_CREATOR:
                    printf("Image creator is %s\n",
                        pPropBuffer[i]->value);
                    break;
                    ....
                }
            }
        }
    }
}
```

FIG. 6 summarizes a set of exemplary encoder (metadata sink) functions. The two identified functions enable applications to pass generic property items/metadata previously created by a decoder to a specified buffer in a metadata sink. This operation is useful for an encoder function/utility that takes the buffered generic metadata and stores the generic metadata in a native format image file. The encoder functions facilitate converting received generic metadata to a particular image file format (e.g., .bmp) by providing a buffer location for storing generic metadata that an encoder converts to a particular image file format. During a save operation, the encoder converts and saves the buffered metadata in a particular format image file, and releases the buffer.

The encoder and decoder APIs together facilitate a wide variety of metadata manipulation operations. For example, an editor function calls the functions to convert an image file, including the metadata, from a first format (e.g., BMP) to a second format (e.g., JPG). Another example of an operation is editing an image file's metadata utilizing an abstraction interface-aware application. A user initially retrieves metadata from an image file using a decoder API. The user edits the metadata and then invokes the encoder APIs to store the edited metadata in a buffer. An encoder either separate, or incorporated into the abstraction interface 210 then saves the buffered metadata in the same file format as the original metadata.

A GetPropertyBuffer sink function 420 enables an application to request a metadata sink to allocate a buffer to store metadata property items. The input parameter, "uiTotalBufferSize," is an unsigned integer value indicating the requested buffer size. Input/output parameter "ppBuffer" is a pointer to a newly allocated buffer owned by the metadata sink. Thus, the GetPropertyBuffer sink function 420 enables an application to ask the metadata sink to allocate a buffer of a specified size for storing the property data.

A PushPropertyItems sink function 422 enables the application to pass metadata property items to a metadata sink via the above-mentioned buffer. An input parameter "uiNumOfPropertyItems" is an unsigned integer representing the number of property items passed to the metadata sink. Another input parameter, "uiTotalBufferSize, " is an unsigned integer representing the size, in bytes, of the items passed to the metadata sink buffer. The final input parameter, "pItemBuffer" is a pointer to an input buffer that holds the metadata property items that the application is passing to the metadata sink. Since the sink owns the memory, the sink determines when to read the data from the buffer and release the memory.

The following is yet another example of a potential use of the above-mentioned encoder support functions. During a save operation, a metadata application determines whether any new or modified generic metadata property items need to be passed to a particular encoder. If such property items exist, then the application calls the GetPropertyBuffer sink function 420. The application specifies the size of memory needed to store the generic metadata property items. The sink/encoder allocates the memory for the metadata property items and then returns a memory pointer to the application. The application stores the metadata property items in the buffer and then passes the buffered data to the encoder/sink through the allocated memory buffer by calling the PushPropertyItems sink function 420. The application, through the PushPropertyItems sink function 420 notifies the sink/ encoder how many property items are stored and the total memory consumed by the metadata property items in an identified buffer.

A number of exemplary application program interfaces and corresponding functions are presented herein above. However, as those skilled in the art will appreciate, this set of API's is merely exemplary, and many more API's can be provided to enhance the functionality of the abstraction interface 210 to provide simple, flexible, format-independent access to multimedia (e.g., image) metadata.

Figure 7:
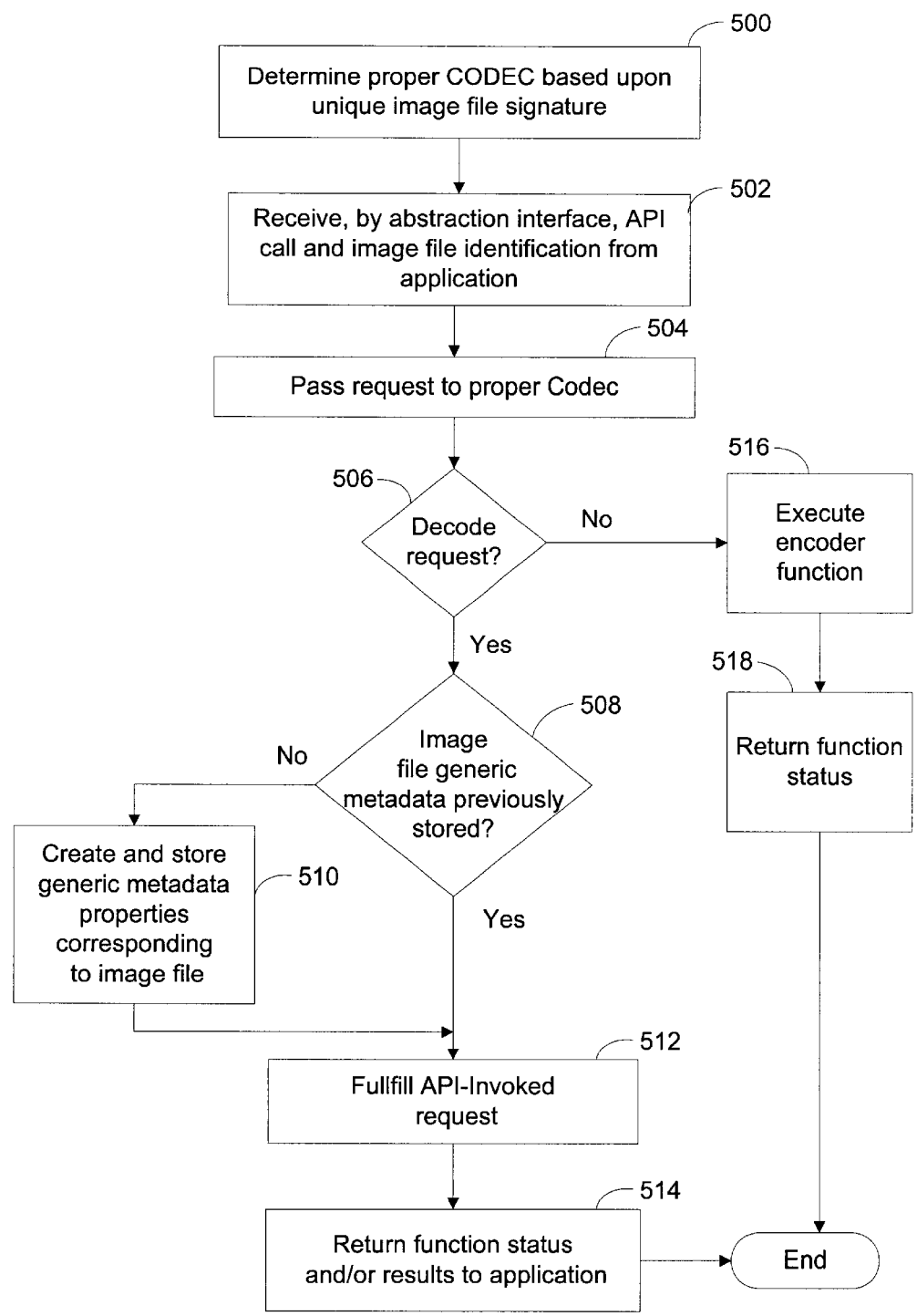
FIG. 7 is a flowchart summarizing an exemplary sequence of stages performed by an abstraction interface to process an API call by an external program.

FIG. 7 generally describes the steps performed by an abstraction interface to execute a call directed to one of the above-described APIs. The APIs are carried out in the form of program objects. However, the APIs can be procedures, functions or any one of a set of program execution constructs.

During step 500, the application and abstraction interface determine the proper codec for handling subsequent codec API calls by the application. In an embodiment of the invention, step 500 is accomplished by creating an abstraction interface object providing a connection between the application and a particular one of the format-specific codecs in the abstraction interface 210. The application passes an image file name to the abstraction interface. The abstraction interface 210 assigns a particular codec type based upon a unique signature provided by the passed file name or the file itself that indicates a particular image file format. Thereafter, the abstraction interface 210 establishes a connection between the particular codec of the set of coder/decoders 212 and the application. For example, the instruction "Image myImg(foo.jpg)" creates a connection between an application and a JPG codec. All subsequent API calls between the application and the abstraction interface are handled by the JPG codec functions. Note however that in alternative embodiments the determining step is performed by analyzing a file name or argument embedded within an API call to a particular supported function. Though not depicted in the summarized steps, the abstraction interface 210 also determines whether an appropriate codec exists. If an appropriate codec does not exist, then the abstraction interface returns a failure status to the application.

During step 502, the abstraction interface 210 receives an API call from the application via the connection. The connection indirectly identifies the file previously identified by the application during step 500. For example, the instruction "myImg.GetPropertyItem(PropertyTagArtist, uiItemSize, pBuffer)" requests the abstraction interface 210 to invoke the GetPropertyItem API associated with the file type designated by the myImg object. Since the file foo.jpg is associated with the myImage object, the JPG API handles the received request. In alternative embodiments, where connections are not maintained, the file name is explicitly recited in the API call.

During step 504, a called API of the APIs 218 passes the application request to a proper one of the coder/decoders 212. At step 506, if the application request concerns a decode function, then control passes to step 508. In an embodiment of the present invention, the decoder for a particular image file decodes the entire metadata portion of the image file in response to a first call by an application to the abstraction interface 210's decoder functions. The abstraction interface 210 stores the resulting generic metadata in the metadata cache 220. Therefore, if at step 508 the decoder function called by the API determines that the generic image metadata is not presently stored in the metadata cache 220, then control passes to step 510. During step 510, the decoder processes the entire set of metadata properties in the particular image file and stores the resulting set of generic metadata properties in the metadata cache 220. In an alternative embodiment, the decoders only process enough metadata to fulfill a particular request by an application. In such alternative embodiment, steps 508 and 510 are modified to search for, process, and store only the metadata items required to complete a particular request for metadata by an application. Upon storing the generic data control passes from step 510 to step 512. If, at step 508, the decoder determines that the needed metadata exists in the metadata cache 220, then control passes directly to step 512.

During step 512 the decoder function invoked by the API performs the requested function with regard to the image file property or properties identified in the application's API call. In the illustrative embodiment of the invention, the function comprises one of the eight functions associated with the APIs set forth in FIG. 5. However, the set of decoder APIs is exemplary and can be modified without deviating from the present invention. After completing the function, control passes to step 512 wherein the function returns a status and/or results to the calling API. The API, in turn, returns the status and/or results to the calling application. Control then passes to the End.

If at step 506, the request is for execution of an encoder-related function (see, FIG. 6), then control passes to step 516. At step 516, the called encoder function performs the requested operation. The set of encoder-related API's is exemplary. Those skilled in the art will appreciate that the set of encoder APIs can be modified without deviating from the present invention. Control then passes to step 518 wherein the function returns a status reporting either success or failure of the encoder function's attempt to complete the application's request. Control then passes to the End.

The above-described steps are merely exemplary. As those skilled in the are will readily appreciate for the disclosure herein, there are multiple arrangements of APIs, procedures, objects, functions, applets, and other program constructs that may be assembled and organized to provide the disclosed abstraction interface functionality. The goal and spirit of the present invention is to provide an abstraction interface that insulates applications from the idiosyncrasies of the multiple differing metadata formats used to store multimedia (e.g., image) files, thereby ensuring the continued viability of legacy image file formats and the devices that store image, and more generally multimedia, data in the legacy image file formats.

Illustrative embodiments of the present invention and certain variations thereof have been provided in the Figures and accompanying written description. The metadata abstraction interface architecture represents an extensible interface between image files stored in a wide variety of formats and applications that with to retrieve and act upon the content of the image files—or more generally multimedia files.

The present invention is not intended to be limited to the disclosed embodiments. Rather the present invention is intended to cover the disclosed embodiments as well as others falling within the scope and spirit of the invention to the fullest extent permitted in view of this disclosure and the inventions defined by the claims appended herein below.

APPENDIX

```
//----------------------------------------------------------------------
// Image property ID tags
//---------------------------------------------------------------------- define PropertyTagExifIFD        0x8769
define PropertyTagGpsIFD         0x8825 define PropertyTagNewSubfileType    0x00FE
define PropertyTagSubfileType       0x00FF
#define PropertyTagImageWidth        0x0100
#define PropertyTagImageHeight       0x0101
#define PropertyTagBitsPerSample     0x0102
#define PropertyTagCompression       0x0103
#define PropertyTagPhotometricInterp 0x0106
#define PropertyTagThreshHolding     0x0107
#define PropertyTagCellWidth         0x0108
#define PropertyTagCellHeight        0x0109
#define PropertyTagFillOrder         0x010A
#define PropertyTagDocumentName      0x010D
#define PropertyTagImageDescription  0x010E
#define PropertyTagEquipMake         0x010F
#define PropertyTagEquipModel        0x0110
#define PropertyTagStripOffsets      0x0111
#define PropertyTagOrientation       0x0112
#define PropertyTagSamplesPerPixel   0x0115
#define PropertyTagRowsPerStrip      0x0116
#define PropertyTagStripBytesCount   0x0117
#define PropertyTagMinSampleValue    0x0118
#define PropertyTagMaxSampleValue    0x0119
#define PropertyTagXResolution       0x011A  // Image resolution in width direction
#define PropertyTagYResolution       0x011B  // Image resolution in height direction
#define PropertyTagPlanarConfig      0x011C  // Image data arrangement
#define PropertyTagPageName          0x011D
#define PropertyTagXPosition         0x011E
#define PropertyTagYPosition         0x011F
#define PropertyTagFreeOffset        0x0120
#define PropertyTagFreeByteCounts    0x0121
#define PropertyTagGrayResponseUnit  0x0122
#define PropertyTagGrayResponseCurve 0x0123
#define PropertyTagT4Option          0x0124
#define PropertyTagT6Option          0x0125
#define PropertyTagResolutionUnit    0x0128  // Unit of X and Y resolution
#define PropertyTagPageNumber        0x0129
```

```
#define PropertyTagTransferFuncition  0x012D
#define PropertyTagSoftwareUsed       0x0131
#define PropertyTagDateTime           0x0132
#define PropertyTagArtist             0x013B
#define PropertyTagHostComputer       0x013C
#define PropertyTagPredictor          0x013D
#define PropertyTagWhitePoint         0x013E
#define PropertyTagPrimaryChromaticities 0x013F
#define PropertyTagColorMap           0x0140
#define PropertyTagHalftoneHints      0x0141
#define PropertyTagTileWidth          0x0142
#define PropertyTagTileLength         0x0143
#define PropertyTagTileOffset         0x0144
#define PropertyTagTileByteCounts     0x0145
#define PropertyTagInkSet             0x014C
#define PropertyTagInkNames           0x014D
#define PropertyTagNumberOfInks       0x014E
#define PropertyTagDotRange           0x0150
#define PropertyTagTargetPrinter      0x0151
#define PropertyTagExtraSamples       0x0152
#define PropertyTagSampleFormat       0x0153
#define PropertyTagSMinSampleValue    0x0154
#define PropertyTagSMaxSampleValue    0x0155
define PropertyTagTransferRange      0x0156 define PropertyTagJPEGProc           0x0200
define PropertyTagJPEGInterFormat    0x0201
#define PropertyTagJPEGInterLength    0x0202
#define PropertyTagJPEGRestartInterval 0x0203
#define PropertyTagJPEGLosslessPredictors 0x0205
#define PropertyTagJPEGPointTransforms    0x0206
#define PropertyTagJPEGQTables        0x0207
#define PropertyTagJPEGDCTables       0x0208
define PropertyTagJPEGACTables       0x0209 define PropertyTagYCbCrCoefficients  0x0211
define PropertyTagYCbCrSubsampling   0x0212
#define PropertyTagYCbCrPositioning   0x0213
define PropertyTagREFBlackWhite      0x0214 define PropertyTagICCProfile         0x0300
define PropertyTagGamma              0x0301
#define PropertyTagICCProfileDescriptor 0x0302
#define PropertyTagSRGBRenderingIntent 0x0303
```

```
#define PropertyTagImageTitle      0x0320
#define PropertyTagCopyright       0x8298

// Extra TAGs (Like Adobe Image Information tags etc.)

#define PropertyTagResolutionXUnit        0x5001
#define PropertyTagResolutionYUnit        0x5002
#define PropertyTagResolutionXLengthUnit  0x5003
#define PropertyTagResolutionYLengthUnit  0x5004
#define PropertyTagPrintFlags             0x5005
#define PropertyTagPrintFlagsVersion      0x5006
#define PropertyTagPrintFlagsCrop         0x5007
#define PropertyTagPrintFlagsBleedWidth   0x5008
#define PropertyTagPrintFlagsBleedWidthScale 0x5009
#define PropertyTagHalftoneLPI            0x500A
#define PropertyTagHalftoneLPIUnit        0x500B
#define PropertyTagHalftoneDegree         0x500C
#define PropertyTagHalftoneShape          0x500D
#define PropertyTagHalftoneMisc           0x500E
#define PropertyTagHalftoneScreen         0x500F
#define PropertyTagJPEGQuality            0x5010
#define PropertyTagGridSize               0x5011
#define PropertyTagThumbnailFormat        0x5012 // 1 = JPEG, 0 = RAW RGB
#define PropertyTagThumbnailWidth         0x5013
#define PropertyTagThumbnailHeight        0x5014
#define PropertyTagThumbnailColorDepth    0x5015
#define PropertyTagThumbnailPlanes        0x5016
#define PropertyTagThumbnailRawBytes      0x5017
#define PropertyTagThumbnailSize          0x5018
#define PropertyTagThumbnailCompressedSize 0x5019
#define PropertyTagColorTransferFunction  0x501A
#define PropertyTagThumbnailData          0x501B// RAW thumbnail bits in
                                    // JPEG format or RGB format
                                    // depends on
                                    // PropertyTagThumbnailFormat // Thumbnail related TAGs define PropertyTagThumbnailImageWidth    0x5020 // Thumbnail width
define PropertyTagThumbnailImageHeight   0x5021 // Thumbnail height
#define PropertyTagThumbnailBitsPerSample 0x5022 // Number of bits per
                                    // component
#define PropertyTagThumbnailCompression   0x5023 // Compression Scheme
#define PropertyTagThumbnailPhotometricInterp 0x5024 // Pixel composition
#define PropertyTagThumbnailImageDescription 0x5025 // Image Tile
```

```
#define PropertyTagThumbnailEquipMake      0x5026  // Manufacturer of Image
                                                   // Input equipment
#define PropertyTagThumbnailEquipModel     0x5027  // Model of Image input
                                                   // equipment
#define PropertyTagThumbnailStripOffsets   0x5028  // Image data location
#define PropertyTagThumbnailOrientation    0x5029  // Orientation of image
#define PropertyTagThumbnailSamplesPerPixel 0x502A // Number of components
#define PropertyTagThumbnailRowsPerStrip   0x502B  // Number of rows per strip
#define PropertyTagThumbnailStripBytesCount 0x502C // Bytes per compressed
                                                   // strip
#define PropertyTagThumbnailResolutionX    0x502D  // Resolution in width
                                                   // direction
#define PropertyTagThumbnailResolutionY    0x502E  // Resolution in height
                                                   // direction
#define PropertyTagThumbnailPlanarConfig   0x502F  // Image data arrangement
#define PropertyTagThumbnailResolutionUnit 0x5030  // Unit of X and Y
                                                   // Resolution
#define PropertyTagThumbnailTransferFunction 0x5031 // Transfer function
#define PropertyTagThumbnailSoftwareUsed   0x5032  // Software used
#define PropertyTagThumbnailDateTime       0x5033  // File change date and
                                                   // time
#define PropertyTagThumbnailArtist         0x5034  // Person who created the
                                                   // image
#define PropertyTagThumbnailWhitePoint     0x5035  // White point chromaticity
#define PropertyTagThumbnailPrimaryChromaticities 0x5036
                                                   // Chromaticities of
                                                   // primaries
#define PropertyTagThumbnailYCbCrCoefficients 0x5037 // Color space transforma-
                                                   // tion coefficients
#define PropertyTagThumbnailYCbCrSubsampling 0x5038 // Subsampling ratio of Y
                                                   // to C
#define PropertyTagThumbnailYCbCrPositioning 0x5039 // Y and C position
#define PropertyTagThumbnailRefBlackWhite  0x503A  // Pair of black and white
                                                   // reference values
define PropertyTagThumbnailCopyRight      0x503B  // CopyRight holder define PropertyTagLuminanceTable          0x5090
define PropertyTagChrominanceTable        0x5091 define PropertyTagFrameDelay              0x5100
define PropertyTagLoopCount               0x5101 define PropertyTagPixelUnit               0x5110  // Unit specifier for pixel/unit
define PropertyTagPixelPerUnitX           0x5111  // Pixels per unit in X
#define PropertyTagPixelPerUnitY           0x5112  // Pixels per unit in Y
```

```
#define PropertyTagPaletteHistogram 0x5113 // Palette histogram

// EXIF specific tag define PropertyTagExifExposureTime  0x829A
define PropertyTagExifFNumber       0x829D define PropertyTagExifExposureProg  0x8822
define PropertyTagExifSpectralSense 0x8824
#define PropertyTagExifISOSpeed      0x8827
define PropertyTagExifOECF          0x8828 define PropertyTagExifVer           0x9000
define PropertyTagExifDTOrig        0x9003 // Date & time of original
define PropertyTagExifDTDigitized   0x9004 // Date & time of digital data generation define PropertyTagExifCompConfig    0x9101
define PropertyTagExifCompBPP       0x9102 define PropertyTagExifShutterSpeed  0x9201
define PropertyTagExifAperture      0x9202
#define PropertyTagExifBrightness    0x9203
#define PropertyTagExifExposureBias  0x9204
#define PropertyTagExifMaxAperture   0x9205
#define PropertyTagExifSubjectDist   0x9206
#define PropertyTagExifMeteringMode  0x9207
#define PropertyTagExifLightSource   0x9208
#define PropertyTagExifFlash         0x9209
#define PropertyTagExifFocalLength   0x920A
#define PropertyTagExifMakerNote     0x927C
#define PropertyTagExifUserComment   0x9286
#define PropertyTagExifDTSubsec      0x9290 // Date & Time subseconds
#define PropertyTagExifDTOrigSS      0x9291 // Date & Time original subseconds
define PropertyTagExifDTDigSS       0x9292 // Date & TIme digitized subseconds define PropertyTagExifFPXVer        0xA000
define PropertyTagExifColorSpace    0xA001
#define PropertyTagExifPixXDim       0xA002
#define PropertyTagExifPixYDim       0xA003
#define PropertyTagExifRelatedWav    0xA004 // related sound file
#define PropertyTagExifInterop       0xA005
#define PropertyTagExifFlashEnergy   0xA20B
#define PropertyTagExifSpatialFR     0xA20C // Spatial Frequency Response
#define PropertyTagExifFocalXRes     0xA20E // Focal Plane X Resolution
#define PropertyTagExifFocalYRes     0xA20F // Focal Plane Y Resolution
```

```
#define PropertyTagExifFocalResUnit  0xA210  // Focal Plane Resolution Unit
#define PropertyTagExifSubjectLoc    0xA214
#define PropertyTagExifExposureIndex 0xA215
#define PropertyTagExifSensingMethod 0xA217
#define PropertyTagExifFileSource    0xA300
#define PropertyTagExifSceneType     0xA301
define PropertyTagExifCfaPattern    0xA302 define PropertyTagGpsVer            0x0000
define PropertyTagGpsLatitudeRef    0x0001
#define PropertyTagGpsLatitude       0x0002
#define PropertyTagGpsLongitudeRef   0x0003
#define PropertyTagGpsLongitude      0x0004
#define PropertyTagGpsAltitudeRef    0x0005
#define PropertyTagGpsAltitude       0x0006
#define PropertyTagGpsGpsTime        0x0007
#define PropertyTagGpsGpsSatellites  0x0008
#define PropertyTagGpsGpsStatus      0x0009
#define PropertyTagGpsGpsMeasureMode 0x00A
#define PropertyTagGpsGpsDop         0x000B  // Measurement precision
#define PropertyTagGpsSpeedRef       0x000C
#define PropertyTagGpsSpeed          0x000D
#define PropertyTagGpsTrackRef       0x000E
#define PropertyTagGpsTrack          0x000F
#define PropertyTagGpsImgDirRef      0x0010
#define PropertyTagGpsImgDir         0x0011
#define PropertyTagGpsMapDatum       0x0012
#define PropertyTagGpsDestLatRef     0x0013
#define PropertyTagGpsDestLat        0x0014
#define PropertyTagGpsDestLongRef    0x0015
#define PropertyTagGpsDestLong       0x0016
#define PropertyTagGpsDestBearRef    0x0017
#define PropertyTagGpsDestBear       0x0018
#define PropertyTagGpsDestDistRef    0x0019
#define PropertyTagGpsDestDist       0x001A
```

APPENDIX END

What is claimed is:

1. A multimedia metadata abstraction interface supporting program access to multimedia file metadata provided in a variety of formats, the abstraction interface comprising:

a multimedia program interface corresponding to a set of multimedia file metadata management functions accessible by multimedia applications; and a set of metadata decoders comprising a set of functions invoked by the multimedia application program interface, each metadata decoder including a metadata converter for parsing a metadata portion of a multimedia file to render metadata in a generic format;

wherein the multimedia program interface comprises a set of program instruction segments for invoking a specified one of the set of functions supported by the set of metadata decoders in response to receiving a program request to access metadata corresponding to a multimedia file instance.

2. The multimedia metadata abstraction interface of claim 1 further comprising a set of metadata encoders, each encoder including a metadata converter for extracting data stored in the generic form and rendering metadata for a multimedia file in a specified format.

3. The multimedia metadata abstraction interface of claim 1 wherein the multimedia file is an image file.

4. The multimedia metadata abstraction interface of claim 1 wherein the generic format supports an extensible superset of metadata types for supported multimedia file formats.

5. The multimedia metadata abstraction interface of claim 1 wherein the set of program instruction segments comprises a set of application program interfaces enabling an application to invoke codec functions providing access to metadata within multimedia files rendered in the generic metadata format.

6. The multimedia metadata abstraction interface of claim 1 wherein the set of set of metadata decoders is extensible thereby allowing adding new decoders to extend the range of multimedia file metadata formats supported by the abstraction interface.

7. The multimedia metadata abstraction interface of claim 1 wherein the set of functions invoked by the multimedia program interface includes at least one function for rendering a metadata property item value from the metadata in a generic format in response to a request to the multimedia program interface.

8. The multimedia metadata abstraction interface of claim 7 wherein the set of functions invoked by the multimedia program interface includes at least one function for changing a generic multimedia property item value.

9. The multimedia metadata abstraction interface of claim 7 wherein the set of functions invoked by the multimedia program interface includes at least one function for facilitating passing a generic multimedia metadata property item value to an encoder for rendering the multimedia metadata property item value in a file type-specific format.

10. The multimedia metadata abstraction interface of claim 1 wherein the set of metadata decoders comprise program instructions for storing rendered generic metadata property items in a generic metadata memory.

11. A method for providing access by programs to multimedia metadata stored in a variety of formats through a metadata abstraction interface interposed between the programs and the multimedia metadata, the method comprising the steps of:

determining a proper module comprising a set of functions for servicing requests by a program to access metadata within a particular multimedia file;

first receiving, by the abstraction interface, a first request to access the metadata within the particular multimedia file;

invoking, in response to the receiving step, a format-specific decoder function corresponding to the first request to access; and rendering, by the format-specific decoder function, generic multimedia metadata property items from format-specific metadata stored within the particular multimedia file.

12. The method of claim 11 wherein the receiving step is performed in the abstraction interface by an application program interface.

13. The method of claim 11 further comprising invoking a format-specific encoder function within a specified encoder of a set of format-specific encoders to pass at least one generic metadata property item to the specified encoder.

14. The method of claim 13 further comprising converting, by the specified encoder, the at least one generic metadata property item to a format-specific metadata property item.

15. The method of claim 11 further comprising the steps of:

second receiving, by the abstraction interface, a second request to access the metadata within the particular multimedia file;

determining that at least one generic multimedia metadata property item, previously rendered for the metadata within the particular multimedia file, exists within a generic metadata memory associated with the abstraction interface, and in response accessing a generic metadata property value for the particular multimedia file from the generic metadata memory.

16. The method of claim 11 further comprising the step of presenting, by the abstraction interface, at least one metadata property item value from the generic multimedia property items in response to the first request.

17. The method of claim 11 further comprising the step of passing to a format-specific encoder at least one metadata property item value from the generic multimedia property items.

18. A computer-readable medium having computer executable instructions for providing a metadata abstraction interface facilitating access by programs to multimedia file metadata stored in a variety of formats, the computer executable instructions performing steps including:

determining a proper module comprising a set of functions for servicing requests by a program to access metadata within a particular multimedia file;

first receiving, by the abstraction interface, a first request to access the metadata within the particular multimedia file;

invoking, in response to the receiving step, a format-specific decoder function corresponding to the first request to access; and rendering, by the format-specific decoder function, generic multimedia metadata property items from format-specific metadata stored within the particular multimedia file.

19. The computer-readable medium of claim 18 wherein the receiving step is performed in the abstraction interface by application program interface computer instructions.

20. The computer-readable medium of claim 18 further comprising computer executable instructions for performing the step of: invoking a format-specific encoder function within a specified encoder of a set of format-specific encoders to pass at least one generic metadata property item to the specified encoder.

21. The computer-readable medium of claim 20 further comprising computer executable instructions for converting, by the specified encoder, the at least one generic metadata property item to a format-specific metadata property item.

22. The computer-readable medium of claim 18 further comprising computer executable instructions for performing the steps of:

second receiving, by the abstraction interface, a second request to access the metadata within the particular multimedia file;

determining that at least one generic multimedia metadata property item, previously rendered for the metadata within the particular multimedia file, exists within a generic metadata memory associated with the abstraction interface, and in response accessing a generic metadata property value for the particular multimedia file from the generic metadata memory.

23. The computer-readable medium of claim 18 further comprising computer executable instructions for performing the step of: presenting, by the abstraction interface, at least one metadata property item value from the generic multimedia property items in response to the first request.

24. The computer-readable medium of claim 11 further comprising computer executable instructions for performing the step of: passing to a format-specific encoder at least one metadata property item value from the generic multimedia property items.

* * * * *

UNITED STATES PATENT AND TRADEMARK OFFICE
CERTIFICATE OF CORRECTION

PATENT NO.    : 6,523,046 B2                                            Page 1 of 1
DATED         : February 18, 2003
INVENTOR(S)   : Liu et al.

It is certified that error appears in the above-identified patent and that said Letters Patent is hereby corrected as shown below:

<u>Column 2,</u>
Line 66, "requesters" should read -- requestors --.

Signed and Sealed this

Ninth Day of September, 2003

JAMES E. ROGAN
*Director of the United States Patent and Trademark Office*